United States Patent [19]
Patterson, Jr.

[11] Patent Number: 4,533,101
[45] Date of Patent: Aug. 6, 1985

[54] WINGTIP VORTEX PROPELLER

[75] Inventor: James C. Patterson, Jr., Yorktown, Va.

[73] Assignee: The United States of America as represented by the Administrator of the National Aeronautics & Space Administration, Washington, D.C.

[21] Appl. No.: 576,308

[22] Filed: Feb. 2, 1984

[51] Int. Cl.³ .............................................. B64D 27/02
[52] U.S. Cl. ..................................... 244/199; 244/55
[58] Field of Search ...................... 244/199, 54, 55, 65, 244/58

[56] References Cited
U.S. PATENT DOCUMENTS

| | | |
|---|---|---|
| 2,485,218 | 10/1949 | Shaw ................................. 244/199 |
| 2,604,276 | 7/1952 | Huben . |
| 3,260,476 | 7/1966 | James . |
| 3,997,132 | 12/1976 | Erwin . |
| 4,045,144 | 8/1977 | Loth ................................. 244/199 |
| 4,415,133 | 11/1983 | Phillips ................................. 244/55 |

FOREIGN PATENT DOCUMENTS

| | | | |
|---|---|---|---|
| 3127257 | 1/1983 | Fed. Rep. of Germany ...... 244/199 |
| 484810 | 9/1953 | Italy .................................... 244/199 |

*Primary Examiner*—Galen L. Barefoot
*Attorney, Agent, or Firm*—Howard J. Osborn; John R. Manning; Wallace J. Nelson

[57] ABSTRACT

A device which increases the energy efficiency of aircraft wherein a wingtip pusher propeller 12 is positioned aft of the wingtip 18 to rotate in the crossflow of the wingtip vortex. The propeller 12 rotates against the vortex swirl creating additional thrust from and attenuating the wingtip vortex by simultaneously extracting energy from the vortex and converting it to propeller blade-induced thrust while injecting its high energy wake into the vortex axial flow to dissipate the vortex. As a result, the device increase aircraft fuel efficiency by simultaneously increasing thrust and decreasing vortex induced drag. By attenuating the vortex safety to following aircraft is maximized.

11 Claims, 5 Drawing Figures

WINGTIP VORTEX PROPELLER

ORIGIN OF THE INVENTION

The invention described herein was made by an employee of the United States Government and may be manufactured and used by or for the Government for governmental purposes without the payment of any royalties thereon or therefor.

INTRODUCTION

Under lifting conditions, an airfoil creates a vortex system which is shed along its span, with a concentrated vortex centered just behind each wingtip. This vortex system is a pure byproduct of lift which is not necessary for the production of lift and is a major source of aircraft induced drag, which in turn is responsible for 40% of the total aircraft drag. In addition, a vortex generated by a large aircraft (over 250,000 lbs) poses serious hazards for an aircraft following in or through its path.

The present invention relates generally to aircraft aerodynamics and specifically to a method of increasing the fuel efficiency and environmental safety of a propeller-driven aircraft by positioning a pusher propeller in the crossflow of each of the two wingtip vortices. (A "pusher" propeller is mounted aft of the wing, unlike the fore-positioned "tractor" propeller. The wake of a pusher propeller does not flow over the wing and, therefore, does not increase drag on the wing or interfere with its aerodynamics in any way. A pusher propeller, for example, does not interfere with boundary layer control.) This arrangement converts vortex energy to thrust and further attenuates the wingtip vortices to decrease both induced drag and danger to following aircraft.

Research concentrating on the attenuation of wingtip vortices is not new. Widely known means for dissipation or attenuation of vortices include vertical winglets attached at the wingtips, such as the plates described in U.S. Pat. No. 3,411,738 to Sargent. Various fan-like attachments designed to break up the vortical airflow at the wingtips, to reduce hazards to following aircraft, have also been tested. U.S. Pat. Nos. 3,984,070 and 3,934,844 to Patterson, Jr., and Reighart, II, respectively, are representative of this type art. The patent to Patterson, Jr. discloses a vortex-attenuating spline device attached at the wingtips. That to Reighart, II, describes a vortex generator which creates a vortex opposite in direction to the wingtip vortex, mitigating some of its effects.

Three additional devices known in the art pertain to vortex attenuation. U.S. Pat. No. 3,997,132 to Erwin reveals a jet engine located in the wingtip, the function of which is to interfere with the axial velocity of the vortex produced at the wingtip. This interference breaks up the vortex and induced drag is minimized. U.S. Pat. No. 3,596,854 to Haney discloses a cylindrical vortex generator mounted on the lower surface of the wingtip. The airstream through the cylindrical device is directed into a swirling pattern which opposes and counteracts the vortex formed by the wingtip. Finally, U.S. Pat. No. 2,477,461 to Lee discloses a rotating jet device including wingtip nozzles which dispense rotating jets of pressurized air. These jets encounter the wingtip vortex and oppose it, thus attenuating the vortex and its associated induced drag.

These prior art arrangements increase fuel efficiency in a sense, in the form of decreased drag due to vortex attenuation, but no means has been shown to utilize the wingtip vortex in such a way as to reduce the horsepower (fuel energy) necessary to maintain equivalent propeller thrust on the aircraft while simultaneously attenuating the vortex to reduce induced drag.

Accordingly, it is an object of the present invention to provide a propeller which exerts increased thrust as a result of its placement in the crossflow of a wingtip vortex.

Another object of the invention is to provide a propeller which attenuates a wingtip vortex by injection of its high energy wake into the vortex disrupting its axial flow thus causing the vortex to dissipate.

Still another object of the invention is to provide a propeller which, due to its positioning aft of the trailing edge of the wing and in the crossflow of the vortex, simultaneously utilizes the vortex energy to increase thrust and attenuates the vortex aft of the propeller blades.

Yet another object of the invention is to provide a pusher propeller which facilitates aircraft operation by harnessing the wingtip vortex in such a way as to reduce the horsepower (fuel energy) necessary to maintain equivalent propeller thrust on the aircraft while simultaneously (and additionally) attenuating the vortex to reduce induced drag.

SUMMARY OF THE INVENTION

These and other objects are accomplished by a wingtip vortex propeller which, as an aggregate lift-producing structure positioned on the vortex crossflow, simultaneously creates additional thrust from and attenuates the wingtip vortex.

A propeller is mounted at the tip of the wing and positioned aft of the trailing edge to operate in the crossflow of the wingtip vortex. The propeller is aligned coaxially with the wingtip chord and is mounted aft of the engine nacelle. The engine nacelle houses an ordinary aircraft engine, which powers the propeller.

As with all aircraft propellers, the freestream velocity and the blade rotational velocity vectors add vectorially to yield a resultant velocity, $V_R$. Each propeller blade produces lift (as does the propeller as a whole) at right angles to $V_R$ and, as long as $V_R$ is not parallel to the propeller axis, the forward component of this lift is the thrust exerted by the propeller on the aircraft. The present propeller results in increased thrust, however, due its positioning in the crossflow of the vortex; the vortex velocity adds to the blade velocity to increase the angle of $V_R$ relative to the propeller axis.

As $V_R$ is rotated forward, the aggregate lift is rotated forward an equal amount, and the thrust experienced by the aircraft (the forward component of the aggregate lift) increase proportionally. The thrust produced by a given propeller by a given horsepower is therefore increased as the wingtip vortex increases the angle of $V_R$. Stated differently, a given propeller can produce equivalent thrust at decreased horsepower if the propeller blades are placed in the crossflow of the vortex, requiring less fuel to generate equivalent thrust as a conventional propeller.

In addition to increasing thrust, the propeller simultaneously attenuates the wingtip vortex and does so in two ways. First, it rotates in the opposite direction as the crossflow to oppose and counteract the vortex swirl. Second, the propeller injects the air mass of its exhaust into the vortex to oppose and break up the linear axial vortex flow responsible for perpetuating the vortex swirl. As a result the device facilitates aircraft operation by both increasing thrust and decreasing induced drag.

BRIEF DESCRIPTION OF THE DRAWINGS

The invention will be more fully described in conjunction with the accompanying drawings in which.

DETAILED DESCRIPTION OF THE INVENTION STRUCTURE

Figure 1:
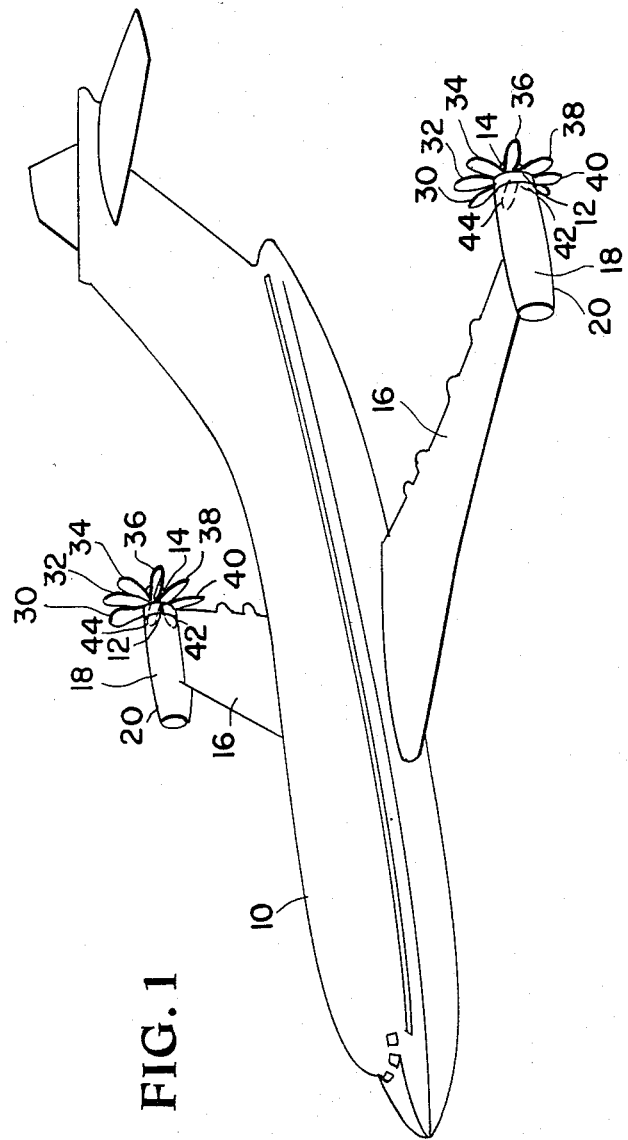
FIG. 1 is a perspective view of the invention with wingtip vortex propellers mounted at the wingtips of an aircraft.

Referring now to the drawings and initially to FIG. 1, a transport type aircraft 10 is shown traveling at cruise speed. The invention positions a wingtip vortex propeller 12 on the wing 16, aft of the wingtip 18, to provide pusher propeller vortex-augmented thrust for the aircraft 10. The propeller 12 includes a propeller hub 14 and high speed propeller blades 30, 32, 34, 36, 38, 40, 42 and 44. The propeller 12 is mounted on a conventional engine nacelle 20 positioned at the wingtip 18.

The test model of the preferred embodiment of the invention included a supported semi-span symmetrical steel airfoil (measuring 41 inches in length, having a wingtip chord of 13 inches). The aspect ratio of the airfoil was, therefore, 6.3 (the ratio of the span$^2$ of the wing area). An eight blade SR-2 high speed propeller constructed of graphite/epoxy composite was mounted at the wingtip by means of its associated engine nacelle. The nacelle was constructed of aluminum and was mounted co-axially with the wingtip chord and measured 25.5 inches in length and 4.5 inches in diameter. The propeller was positioned two inches aft of the trailing edge of the airfoil. The propeller had a blade diameter of 12.5 inches and each blade had a pitch angle of 57°.

OPERATION

Figure 2:
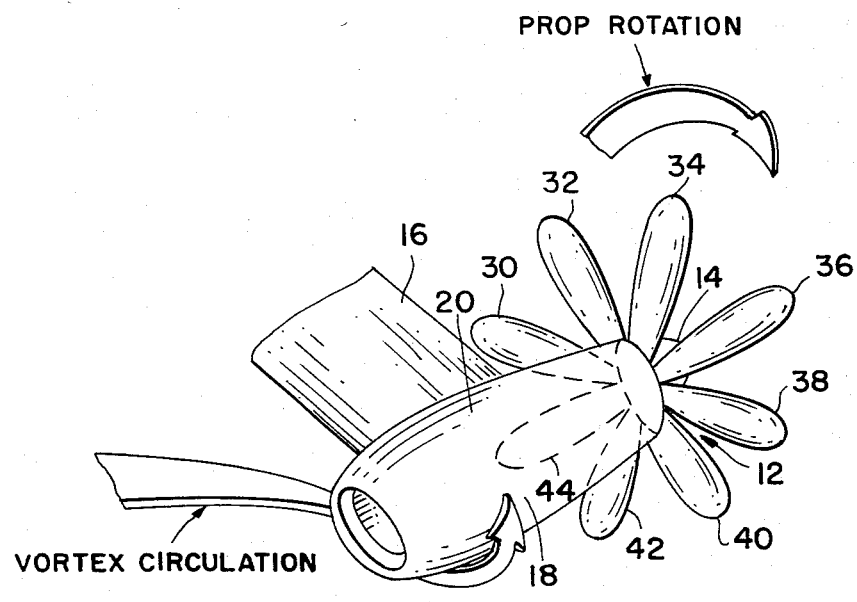
FIG. 2 is a perspective view of the wingtip vortex propeller illustrating the opposing rotation of the propeller and the vortex circulation.

Referring now to FIG. 2, the propeller 12 is positioned in the crossflow of the vortex as illustrated by the direction of the vortex circulation as shown. The airfoil induces a vortex having a core and a crossflow; the core is coaxial to the wingtip chord and has a diameter of less than or equal to 60% of the wingtip chord. The crossflow occurs outside the vortex core; the annular configuration of this vortex velocity surrounds the vortex core and has a total diameter approximately equal to 160% of the wingtip chord. (The vortex remains tightly rolled up aft of the aircraft and retains this diameter at a point at least one wingtip chord behind the wing.) The propeller blades are positioned predominately in the vortex crossflow. The propeller is designed to rotate in the direction *opposite* to the vortex swirl. These opposing velocities permit any given propeller to generate additional thrust (or, likewise, permit equivalent thrust exertion at decreased horsepower) in the manner described below.

Figure 3:
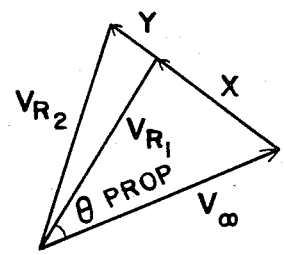
FIG. 3 is a vector diagram illustrating the additive vectors X (propeller blade velocity) and Y (vortex velocity) responsible for rotating $V_R$, forward to $V_{R2}$ to increase thrust on the aircraft.

The propeller 12 includes propeller blades 30, 32, 34, 36, 38, 40, 42 and 44, each having a pitch angle. Each propeller blade is itself an airfoil and, during rotation of the propeller during flight, each blade encounters the air from two different directions. As illustrated schematically in FIG. 3, these two airflows are the propeller blade velocity X (the velocity of propeller rotation) and the freestream velocity $V_\infty$. These two velocities add together to yield the resultant velocity $V_{R1}$. Each propeller blade produces lift at a right angle to $V_{R1}$ and, as long as $V_{R1}$ is not parallel to the propeller axis, the forward component of that aggregate lift is the thrust experienced by the aircraft.

Because the propeller is positioned in the vortex, however, the propeller blades also encounter the vortex velocity Y. The propeller blade velocity X and the vortex velocity Y add together to yield $V_{R2}$, a resultant velocity of increased local flow direction in the presence of the vortex. Therefore, the propeller produces aggregate lift at right angles to $V_{R2}$; as a result of the increased angle of $V_{R2}$, the forward component of lift—thrust—increases proportionately. This increased thrust, therefore, is generated from the vortex velocity and does not require any increase in propeller rotation or fuel consumption.

The above description outlines the net result of the added vectors X and Y as the propeller and the vortex oppose each other in rotation. If the vortex and propeller rotate in the *same* direction, X will be *reduced* by Y, and the configuration will generate *less* thrust than a propeller positioned solely in the freestream. As is described further below, therefore (with reference to FIG. 4), the direction of propeller rotation opposing that of the vortex is an important aspect of the present invention.

During aircraft flight, the wingtip vortex propeller is not operated to generate more thrust than is necessary, but is powered to exert the minimum required thrust at reduced horsepower. The pilot may lower the speed of rotation of the propeller or decrease the blade pitch angle (or both) and permit the calculable vortex velocity to augment the powered velocity to yield an appropriate $V_R$ and corresponding thrust. The higher the vortex velocity is, the lower the blade pitch angle may be to generate a given amount of thrust. As a result, the pilot may reduce the blade pitch angle as an inverse function of the vortex crossflow velocity and maintain constant thrust on the aircraft.

The propeller, by its rotation, also functions to attenuate the wingtip vortex. As the vortex forms around the wingtip, it immediately encounters a propeller rotating in the opposing direction. The opposing rotation of the propeller extracts vortex velocity energy (in the manner described above) and weakens the vortex. Immediately thereafter, the high energy propeller wake is injected into the already weakened vortex, interfering with the axial flow responsible for vortex longevity.

The present vortex propeller, therefore, not only enables production of equivalent thrust at reduced horsepower, but by attenuating the wingtip vortex and its associated induced drag, induces in-flight waste of energy in overcoming unnecessary drag. These two energy-saving results add together to permit the aircraft to operate at significant fuel energy savings: as illustrated below and in FIGS. 4 and 5, the test embodiment of the wingtip vortex propeller enabled fuel savings of 33% over a configuration with the pusher propeller positioned solely in the freestream flow.

Figure 4:
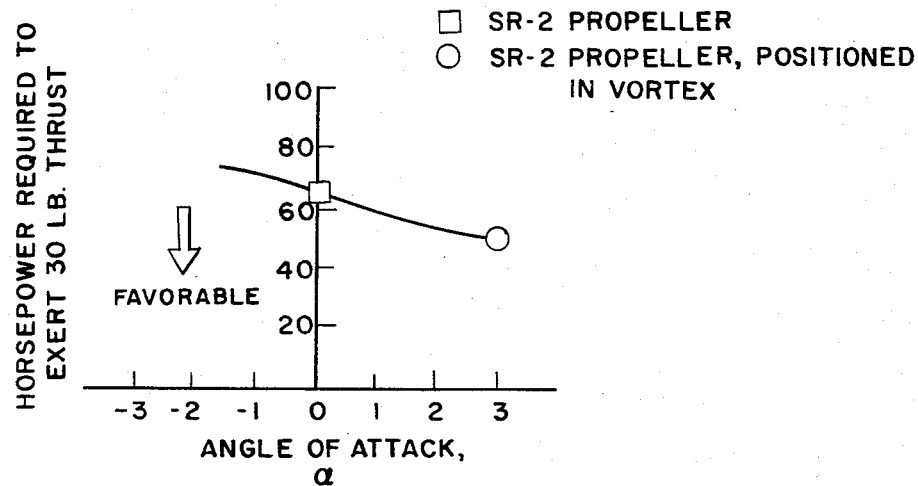
FIG. 4 graphically illustrates the relative reduction in horsepower permitted by positioning a pusher propeller in the vortex crossflow.

The results illustrated in FIG. 4 were obtained at a constant thrust level of approximately twenty-five pounds throughout the positive wing angle of attack range where the direction of rotation of the lift induced vortex flow is opposite to that of the propeller. The device was also tested through the negative angle range where the propeller rotation and vortex flow direction are the same. (NOTE that this wing angle of attack, in a wind tunnel test, represents the deviation from the horizontal: as the symmetrical wing is rotated leading edge up, the direction of lift will also be up and the vortex will circulate from under the wingtip and over. As the symmetrical wing is rotated down, however, the direction of lift is also down and the vortex flow will move from the top of the wingtip and under. At zero angle of attack, of course, the airfoil generates neither lift nor lift-induced vortex. Accordingly, by changing the wing angle of attack, the propeller was tested in vortices of both directions of rotation—maintaining unidirectional propeller rotation throughout—as well as under conditions of no vortex whatsoever.) The horsepower required for constant thrust (25 lb.) decreased through the positive angle range from approximately 66 Hp at $\alpha = 0°$ to 50 Hp at $\alpha = 3°$. With the propeller blade pitch angle fixed, the increase in the vortex flow relative to the propeller with increase in angle of attack of the wing, effectively increases the propeller pitch angle, resulting in a reduction of 2100 rpm (and a commensurate decrease in horsepower required) while maintaining the same thrust level. Commensurately, at negative angles of attack, an increase in rpm (and necessary horsepower) is required to maintain the thrust because of the reduction in propeller blade pitch angle from the vortex flow. As shown in FIG. 4, the propeller required more horsepower in a vortex of the same rotational direction than did the same propeller positioned solely in the freestream ($\alpha = 0°$). Because the required horsepower dropped from approximately 66 Hp to 50 Hp as the propeller was positioned in a counter-rotating vortex, the test device reduced power required by 23% over a freestream pusher propeller.

Figure 5:
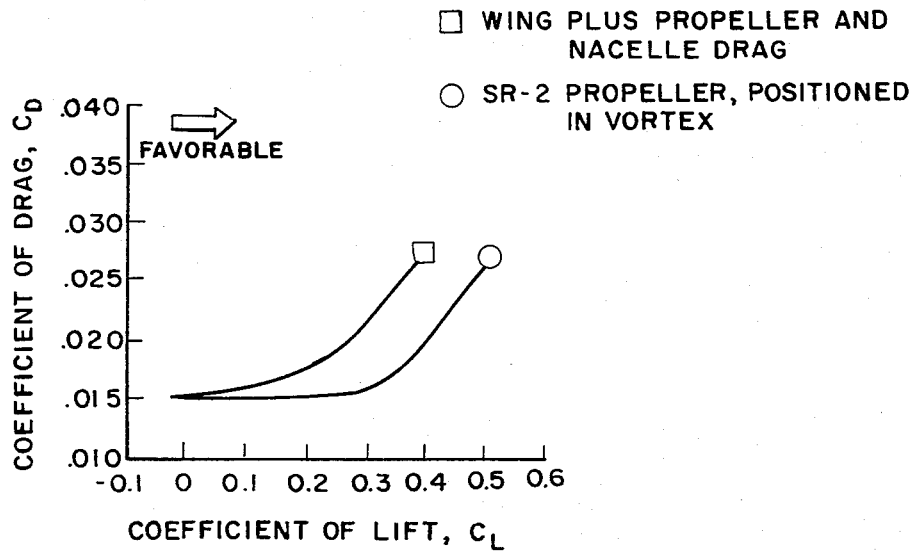
FIG. 5 graphically illustrates the relative reduction in drag permitted by positioning a pusher propeller in the vortex crossflow.

The drag coefficient results illustrated in FIG. 5 were obtained by measuring the resistance of the stationary airfoil to the thrust of the engine by means of a wall mounted balance attached to the wing. The drag coefficient results for the basic wing, including nacelle function drag coefficient and propeller interference for direction comparison, are presented along with the drag coefficient results for the wing with a mounted wingtip vortex propeller. The drag level of the powered turboprop configuration is below that of the basic wing throughout the lift coefficient range tested as a result of the reduction in induced drag afforded by propeller wake/vortex interaction. The reduction in induced drag achieved at a lift coefficient of 0.30 for example, is approximately 25% relative to the wing with the freestream pusher propelle. Relating these data to a transport type aircraft, where approximately 40% of the total cruise drag is induced drag, the results shown indicate a 10% reduction in total drag.

Because the test wingtip vortex propeller both reduced horsepower required to create equivalent thrust by 23% *and* reduced total aircraft drag by 10%, the device enabled an overall fuel energy reduction of 33%. In addition, the significant attenuation of the wingtip vortices improved flight conditions for following aircraft. Finally, no structural reinforcement of the wing was necessary to support the wingtip engines and propellers because the weight of the wingtip structures enhanced the balance between the wingtips and the fuselage, the fulcrum positions coinciding with each center of lift of the aircraft wings. Indeed, the balanced configuration permits the elimination of certain structural reinforcements altogether, with a commensurate decrease in overall aircraft mass and proportionate decrease in fuel energy required for flight.

Various changes may be made in the shape, size and arrangement of parts without departing from the spirit or scope of the invention. For example, the propeller may have as few as two or as many as twelve or more blades, and the propeller and associated aircraft structures may be constructed of any metal, composite, laminate, plastic or other material of a strength to weight ratio suitable to flight conditions. Similarly, the propeller may be of any type including (but not limited to) the two-position, variable pitch, constant speed feathering, reversible pitch and counter-rotating propeller types. Likewise, the propeller may be of any diameter between 60% and 160% of the associated wingtip chord and may be of varying blade widths, blade thicknesses, blade airfoil sections or pitch distributions. The propeller may be mounted immediately aft of the wingtip or within one wingtip chord, and the propeller may be used on any type of aircraft. The aircraft may be powered by any engine or motor or other power generating device. Finally, the pitch of the nacelle and the associated propeller may be rotated to compensate for the cruise angle of attack of the wing to decrease further the overall aircraft drag. These and other applications of the present invention will be readily apparent to those skilled in the art in light of the above teachings. It is therefore to be understood that the invention may be practiced otherwise than as specifically described and claimed herein.

What is claimed as new and desired to be secured by Letters Patent of the United States is:

1. An apparatus for generating thrust from and attenuating a vortex, comprising:
   a moving vehicle;
   lift-producing surface means on said vehicle inducing a wingtip vortex having a core and a crossflow;
   power generating means; and
   propeller means powered by said power generating means and positioned at the wingtip aft of the wing in a pusher configuration located in the highest energy area of said crossflow for simultaneous attenuating the vortex and converting a portion of the crossflow energy to vehicle thrust;
   said propeller means having means for rotating the propeller means in a direction opposite to the flow of the wingtip vortex.

2. An apparatus as in claim 1 wherein said moving vehicle is an aircraft and wherein said lift-producing is surface means is an airfoil.

3. An apparatus as in claim 2 wherein said airfoil is an wing having a leading edge, a trailing edge, and a wingtip chord.

4. An apparatus as in claim 3 wherein said propeller means has propeller blades with a blade diameter greater than 60% and less than 160% of said wingtip chord, said propeller blades having a major portion thereof positioned in the crossflow of the wingtip vortex occurring outside the vortex core.

5. An apparatus as in claim 4 wherein said propeller means has blades having a blade pitch angle determined as an inverse function of the vortex crossflow velocity, whereby the lower blade pitch angle permits a relative reduction in the fuel energy required to generate equivalent thrust.

6. An apparatus as in claim 5 wherein said propeller means is positioned coaxially with said wingtip chord.

7. An apparatus as in claim 5 wherein said propeller blades are mounted within one wingtip chord aft of the trailing edge of said aircraft.

8. An apparatus as in claim 5 wherein said propeller means is positioned coaxially with said wingtip chord and wherein said propeller blades are mounted within one wingtip chord aft of the trailing edge of said aircraft.

9. An apparatus as in claim 6 wherein said propeller means is a pusher propeller constructed and arranged whereby the wake of said propeller does not contact the aerodynamic surfaces of said airfoil.

10. An apparatus as in claim 3 wherein said aircraft includes two semi-span airfoils having an engine-powered propeller and its associated power generating means mounted at the wingtip of each semi-span airfoil.

11. A method of generating thrust from and attenuating a vortex, comprising the steps of:
   providing an aircraft;
   powering said aircraft;
   inducing a wingtip vortex having a crossflow;
   placing an engine-powered propeller on said aircraft at the wingtip with the propeller blades thereof in the cross-flow of the vortex in a pusher configuration and rotating opposite the direction of the wingtip vortices;
   extracting energy with the propeller from the crossflow to increase thrust; and
   simultaneously attenuating the wingtip vortex with the propeller to reduce induced drag of the aircraft.

* * * * *